No. 742,922. PATENTED NOV. 3, 1903.
L. W. SNOWDEN.
TRANSPLANTER.
APPLICATION FILED MAY 5, 1903.
NO MODEL.
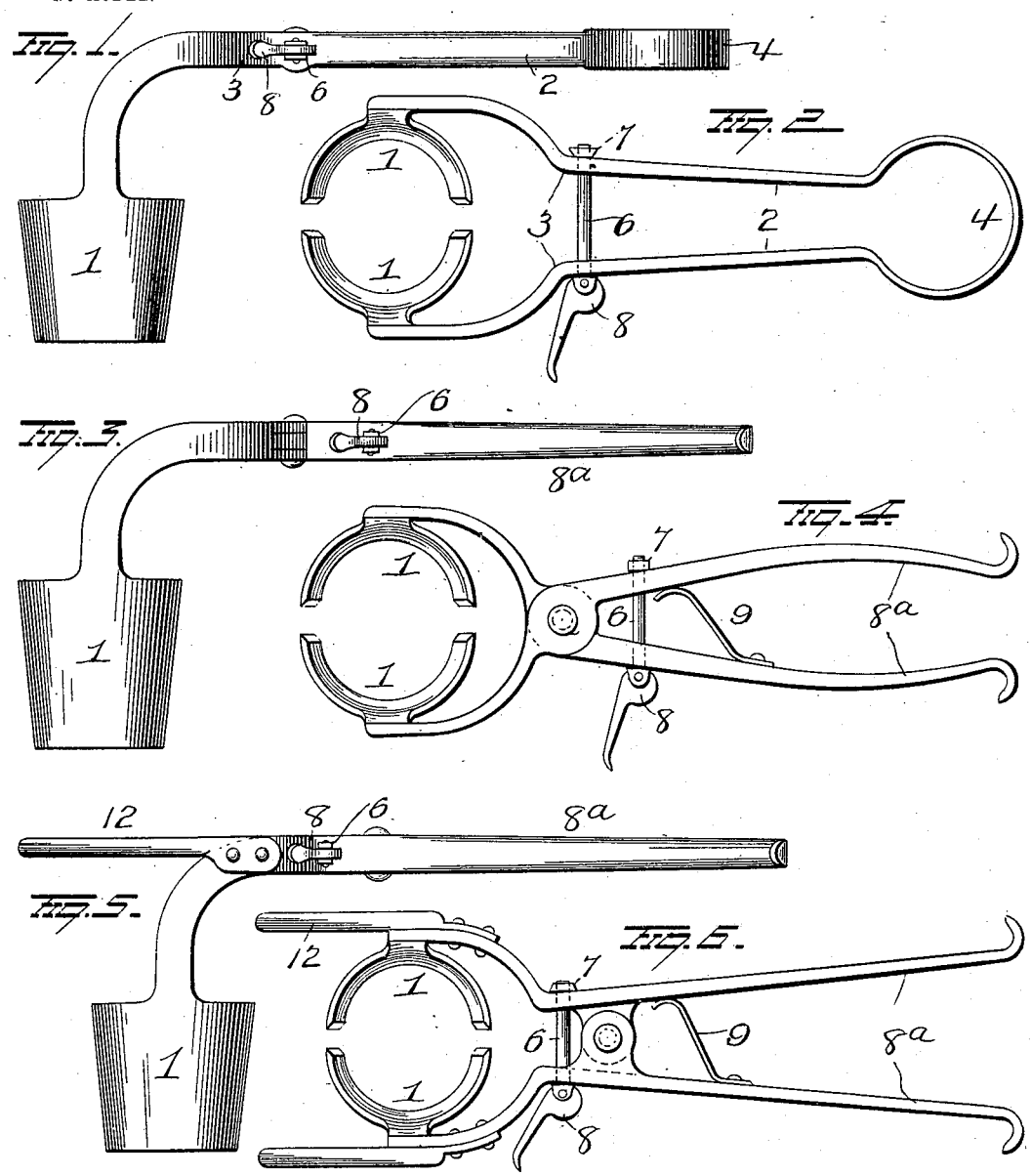

No. 742,922.

Patented November 3, 1903.

UNITED STATES PATENT OFFICE.

LEWIS WALLER SNOWDEN, OF SAN ANTONIO, TEXAS.

TRANSPLANTER.

SPECIFICATION forming part of Letters Patent No. 742,922, dated November 3, 1903.

Application filed May 5, 1903. Serial No. 155,751. (No model.)

*To all whom it may concern:*

Be it known that I, LEWIS WALLER SNOWDEN, a resident of San Antonio, in the county of Bexar and State of Texas, have invented certain new and useful Improvements in Transplanters; and I do hereby declare the following to be a full, clear, and exact description of the invention, such as will enable others skilled in the art to which it appertains to make and use the same.

My invention relates to improvements in transplanters, the object of the invention being to provide improvements of this character which can be readily operated to remove a plant from the ground with the earth around the roots and transplant the same without permitting the earth to fall away from the roots or injure the plant in any way.

A further object is to provide improved means for clamping the earth or soil and releasing the same when planting.

With these objects in view the invention consists in certain novel features of construction and combinations and arrangements of parts, as will be more fully hereinafter described, and pointed out in the claims.

In the accompanying drawings, Figure 1 is a side view illustrating my improvements. Fig. 2 is a top plan view, and Figs. 3, 4, 5, and 6 are views illustrating modifications.

1 1 represent two semiconical blades, which when together form a truncated cone. The blades have sharp cutting lower edges to facilitate their being forced into the ground, and the side edges of the blades are also made sharp to cut through the earth when forced together and to sever any outwardly-protruding branch roots which would otherwise impede the withdrawal of the plant and earth from the ground.

The blades 1 1 are secured to or made integral with handles 2, which curve upward and rearward from the center of the blades and inward toward each other, as shown at 3, and then extend rearward the desired distance and are connected by an integral loop-spring 4, as clearly shown in Fig. 2. As a matter of fact, the preferred way of making the transplanter above described is to stamp the same from a single sheet of steel or other spring metal and then bend the blank so stamped into the shape described.

The handles 2 are made near their outwardly-bent portions 3 with alined openings for the reception of a bolt 6, having a nut 7 on one end, and on the other end a cam-lever 8 is pivoted, so that when said cam-lever is moved in one direction it will hold the blades 1 clamped on the earth or soil around the roots of a plant and when released will permit the blades to separate and allow them to be removed from the earth and roots in planting. The nut 7 limits the opening movement of the blades and can be adjusted at will.

In the modified form of my invention shown in Figs. 3 and 4 the handles 8ª, carrying blades 1, are crossed and pivotally secured together and operate like a pair of shears. A spring 9 is secured to one handle and bears against the other to normally press the blades apart, and a bolt 6, nut 7, and cam-lever 8 are provided to hold the blades clamped around the soil and roots of a plant.

In Figs. 5 and 6 another form of my invention is shown in which the handles are pivoted together, but not crossed, and bolt 6 is located between the pivotal point of the handles and the blades, so that it will clamp the blades around the soil and roots. Forwardly-projecting auxiliary handles 12 are secured to the main handles and serve to assist the operator in forcing the blades into the ground.

A great many other changes might be made in the general form and arrangement of the parts described without departing from my invention, and hence I do not limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a transplanter, the combination with spring-actuated handles, a bolt passing through said handles, of blades fixed to the handles, and a cam-lever pivoted to one end of said bolt and engaging the outer face of one of said handles to force the blades in one direction and hold them in such position.

2. In a transplanter, the combination with spring-actuated handles, of semiconical blades fixed to the handles, a bolt connecting the handles and passing freely through one of them and a cam-lever pivoted to the bolt to move the handles in one direction to clamp soil between the blades.

3. In a transplanter, the combination with spring-actuated handles, of semiconical blades fixed to the handles at one end and sharp on their lower and side edges, a bolt passing freely through both handles, an adjusting-nut on one end of said bolt, and a cam pivoted to the other end thereof and engaging one of the handles.

4. In a transplanter, the combination with spring-actuated handles, of semiconical blades fixed to one end thereof and auxiliary handles secured to the first-mentioned handles and extending out beyond the blades.

5. In a transplanter, the combination with two handles pivotally connected together, of blades secured to the forward ends to the handles and auxiliary handles projecting beyond said blades.

6. In a transplanter, the combination with two handles pivotally connected together, blades at the forward ends of said handles, a spring between the handles in rear of their pivot, a bolt passing through the handles forwardly of their pivot and a cam pivoted to one end of said bolt and engaging one of the handles.

In testimony whereof I have signed this specification in the presence of two subscribing witnesses.

LEWIS WALLER SNOWDEN.

Witnesses:
J. T. WOODHULL,
C. W. NORRIS.